United States Patent
Incavo et al.

(10) Patent No.: US 12,448,558 B2
(45) Date of Patent: Oct. 21, 2025

(54) BLOWOUT-PREVENTERS (BOP) ELASTOMER SEALS WITH IMPROVED SELF-HEALING

(71) Applicant: Hydril USA Distribution, LLC, Houston, TX (US)

(72) Inventors: Joseph Incavo, Houston, TX (US); Nusrat Farzana, Houston, TX (US); Ming Yu Huang, Houston, TX (US)

(73) Assignee: Hydril USA Distribution, LLC, Houston, TX (US)

( * ) Notice: Subject to any disclaimer, the term of this patent is extended or adjusted under 35 U.S.C. 154(b) by 0 days.

(21) Appl. No.: 18/335,473

(22) Filed: Jun. 15, 2023

(65) Prior Publication Data

US 2023/0407161 A1    Dec. 21, 2023

Related U.S. Application Data

(60) Provisional application No. 63/352,506, filed on Jun. 15, 2022.

(51) Int. Cl.
*C09K 8/42* (2006.01)

(52) U.S. Cl.
CPC .................................. *C09K 8/422* (2013.01)

(58) Field of Classification Search
CPC ............ C09K 8/422; C09K 8/40; E21B 43/21
See application file for complete search history.

(56) References Cited

U.S. PATENT DOCUMENTS

| | | | | |
|---|---|---|---|---|
| 6,300,421 | B1* | 10/2001 | Blok | C08K 3/06 525/333.1 |
| 2007/0027245 | A1* | 2/2007 | Vaidya | E21B 33/1208 524/424 |
| 2010/0252254 | A1* | 10/2010 | Nutley | E21B 33/1208 507/203 |
| 2012/0065309 | A1* | 3/2012 | Agrawal | C08K 3/042 977/734 |
| 2013/0256991 | A1* | 10/2013 | Ramon | E21B 33/1208 277/316 |
| 2014/0183381 | A1* | 7/2014 | Carbaugh | E21B 33/062 137/15.18 |
| 2015/0252638 | A1* | 9/2015 | Richards | E21B 21/003 166/292 |
| 2016/0036284 | A1* | 2/2016 | Meng | E21B 4/02 524/404 |
| 2016/0326272 | A1* | 11/2016 | Obrecht | C08C 2/04 |
| 2017/0167219 | A1 | 6/2017 | Wang et al. | |
| 2017/0247296 | A1* | 8/2017 | Salla | C04B 26/02 |
| 2018/0171114 | A1* | 6/2018 | Jiang | C08L 9/00 |

* cited by examiner

*Primary Examiner* — Silvana C Runyan
(74) *Attorney, Agent, or Firm* — Osha Bergman Watanabe & Burton LLP

(57) ABSTRACT

A self-healing elastomeric compound for use in blowout preventer packers includes one or more elastomers, carbon black, silica, and a self-healing agent evenly distributed throughout the compound.

16 Claims, 4 Drawing Sheets

BLOWOUT-PREVENTERS (BOP) ELASTOMER SEALS WITH IMPROVED SELF-HEALING

CROSS REFERENCE TO RELATED APPLICATIONS

This application claims priority to U.S. Provisional Application Ser. No. 63/352,506, filed Jun. 15, 2022, which is herein incorporated by reference in its entirety.

FIELD

The disclosure relates generally to extending the reliability of blowout preventers and more particularly, to self-healing seals and packers.

BACKGROUND

Oil and gas field operations typically involve drilling and operating wells to locate and retrieve hydrocarbons. Rigs are positioned at well sites in relatively deep water. Tools, such as drilling tools, tubing and pipes are deployed at these wells to explore submerged reservoirs. It is important to prevent spillage and leakage of fluids from the well into the environment. A significantly large pressure kick can result in a "blowout" of drill pipe, casing, drilling mud, and hydrocarbons from the wellbore, which can result in failure of the well.

Blowout preventers ("BOPs") are commonly used in the drilling and completion of oil and gas wells to protect drilling and operational personnel, as well as the well site and its equipment, from the effects of a blowout. In a general sense, a blowout preventer is a remotely controlled valve or set of valves that can close off the wellbore in the event of an unanticipated increase in well pressure. Modern blowout preventers typically include several valves arranged in a "stack" surrounding the drill string. The valves within a given stack typically differ from one another in their manner of operation, and in their pressure rating, thus providing varying degrees of well control. Longevity and reliability of BOPs is critical for safe functioning of oil wells.

A typical BOP stack is made up of several ram preventers, topped off with an annular preventer. If a kick is detected, the annular BOP is usually closed first and then the ram is used as a backup if the annular BOP should fail. Multiple blowout preventers of the same type are frequently provided for redundancy, to ensure effectiveness of fail-safe devices.

Typically BOP packers comprise elastomeric polymers which are subject to high pressures and high temperatures in the field. Exposure of elastomeric seals to extreme high temperatures can cause physical and/or chemical deterioration where the seal will initially soften and then swell causing increased friction in dynamic applications. High pressure applications are also prone to failure because room temperature tests may provide inaccurate results. Over time, irreversible chemical changes occur under high pressure/high temperature that increase seal hardness as well as induce compression set and volumetric changes.

Certain industrial activities, such as oil and gas extraction, have increasingly expanded to subsea locations, as the number of available land-based sites has declined. Subsea wells require BOPs to remain submerged for as long as a year in extreme conditions. As a result, BOP assemblies for subsea wells have grown larger and heavier while the space allotted for BOP stacks on existing offshore rigs has not grown commensurately. Accordingly, there is a need in the field for increasing safe operating capacity and extending the life of the BOPs during oil and gas extraction.

SUMMARY

One critical failure mode of conventional BOP packers/seals is cracking under loads of high pressure or high temperature (HP/HT) and repeated cycling. In order to improve the longevity and operating range of the existing packers, provided herein are BOP sealers/packer wherein the elastomer matrix in the packers is modified with self-healing characteristics thereby allowing for in situ healing of the cracks and prevention of degradation of the matrix to the point of failure.

A first embodiment of the present technology provides for a self-healing elastomeric compound that is particularly designed for forming packers or other high-pressure high temperature (HP/HT) seals exhibiting improved performance. Such self-healing elastomeric compounds may include at least one or more elastomers, carbon black, silica, and a self-healing agent. In some embodiments, the elastomer can be a nitrile-butadiene rubber (NBR), hydrogenated nitrile butadiene rubber (HNBR), carboxylated nitrile butadiene rubber (XNBR), fluoroelastomers (FKM), perfluoroelastomers (FFKM), or natural rubber (NR), or a combination of elastomers. In other embodiments the carbon black can be a N326 Carbon Black, N550 Carbon Black, or combination of the two. In some embodiments, the carbon black can have a concentration between 5 phr and 40 phr in the elastomeric compound.

In another embodiment, the silica can be a fumed silica with a concentration between 5 phr and 60 phr in the elastomeric compound. In other embodiments, the self-healing agent can be a polyethyleneimine with a concentration between 0.05 phr and 30 phr in the elastomeric compound. In some embodiments, the self-healing agent is evenly distributed throughout the elastomeric compound.

A second embodiment of the present technology provides for a self-healing blowout preventer (BOP) including at least one elastomeric packer and at least one self-healing agent which is evenly distributed throughout the elastomeric packer. In some embodiments, the BOP can include a variable bore ram packer. In other embodiments, the BOP can include an annular packer. And in another embodiment, the BOP can include a fixer bore ream packer.

In some embodiments, the self-healing agent can be made of polyethyleneimine. In some embodiments, self-healing agents can be multifunctional, cationic, branched polyethyleneimines having compositions commercially available under the name Lupasol®, such as Lupasol PR. In other embodiments the self-healing agent can have a concentration between 0.05 phr and 30 phr in the BOP.

A third embodiment of the present technology provides for a method to increase the life of a BOP by dispersing at least one self-healing agent evenly throughout the BOP packer, where the self-healing agent is a polyethyleneimine. In other embodiments, fumed silica can also be dispersed throughout the BOP packer. In another embodiment, the self-healing agent can activate under crack-propagating conditions. In some embodiments, the activated self-healing agent can repair micro-cracks in the BOP packer.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
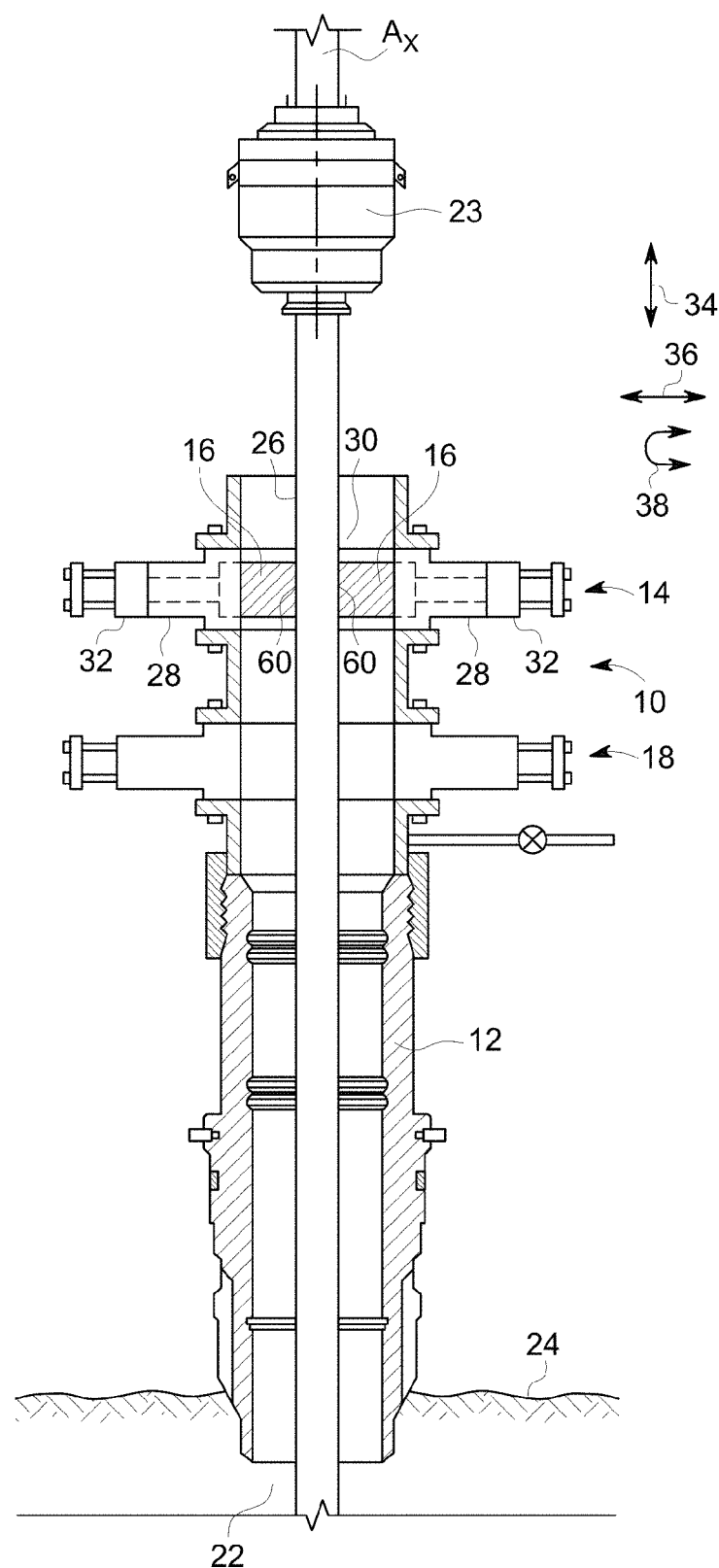
FIG. 1 is a cross-sectional view of a BOP stack.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Elastomeric packers/sealing elements in blowout-preventers (BOPs) can be used to seal around various pipe sizes. The variable ram packer can consist of metallic inserts and elastomers that work as a coherent unit to create a seal. The elastomers that can currently be used in the field undergo large deformations across the bore face, face recess and other critical regions during operation. These deformations can result in a breakdown of the material that eventually leads to failure. In addition to the BOP packers, other high-pressure high temperature (HP/HT) seals can also have a number of failure modes related to cracking, such as rapid gas decompression and fatigue, leading to a lack of reliable sealing under HP/HT conditions.

Provided herein are methods for improving the reliability of packers and sealers including HP/HT sealers and BOP sealers/packers. The methods involve elastomeric materials with self-healing properties in BOP packers which are susceptible to stress and cracking. The compositions described herein allow for cracks to be healed as soon as they are formed, thereby improving the reliability and application space of packers and seals, including BOP packers and HP/HT seals.

As used herein, in one embodiment, the term "elastomer" or "elastomeric" encompasses thermosets (e.g., polymers requiring vulcanization). In a further embodiment, the term "elastomer" or "elastomeric" encompasses thermoplastics. In yet another embodiment, the term "elastomer" or "elastomeric" encompasses a mixture of one or more thermosets and one or more thermoplastics. In one group of embodiments, any elastomer-based packer described herein is comprised of one or more of nitrile-butadiene rubber (NBR), hydrogenated nitrile butadiene rubber (HNBR), carboxylated nitrile butadiene rubber (XNBR), fluoroelastomers (FKM), perfluoroelastomers (FFKM), natural rubber (NR), and the like, or combinations thereof. In another group of embodiments, examples of the elastomeric material may include rubber, neoprene, nitrile rubber, hydrogenated nitrile rubber, carboxylated nitrile rubber, natural rubber, butyl rubber, ethylene-propylene rubber, epichlorohydrin, chlorosulfonated polyethylene, fluoroelastomers, and the like, or combinations thereof.

As used herein, "processing conditions encountered during compounding of the packer and during normal operation of the packer" relate to typical temperatures and pressures during compression molding of the packer. Typical temperatures during compression molding of the packer may vary from about 100 deg. C. to about 210 deg. C., although other temperature ranges are possible and are expressly contemplated herein as being within the scope of embodiments described herein. Typical pressures during compression molding of the packer may vary from about 90 psi to about 110 psi, although other pressure ranges are possible and are expressly contemplated herein as being within the scope of embodiments described herein.

As used herein, "crack-propagating conditions in the elastomer" refers to conditions which impose higher than normal stress/strain in the BOP packer. During normal operations, the BOP packers are typically subjected to a temperature range of about 0 deg. C. to about 177 deg. C. under about 15-20 psi pressures. However, the combination of high temperatures (HT) and high pressures (HP) along with cyclic loading can trigger cracks in the elastomeric packer. For example, microcracks from which failure of the BOP can originate may arise from slippage between polymer chains producing reorientation where the chains acquire a state of tension. Subsequently, local scission can occur which then can propagate to neighboring chains which may cause cracks that propagate irreversibly. Under such crack propagating conditions, the self-healing agent would initiate healing of the elastomer. Activation of the self-healing agent in self-healing elastomeric compounds according to embodiments of the present disclosure under crack-propagating conditions includes initiation of chemical bond creations within the compound. Thus, when crack-propagating conditions (e.g., HT and HP conditions) activate the self-healing agent in a self-healing elastomeric compound, the self-healing agent is triggered to initiate chemical bond creation within the compound, thereby repairing micro-cracks formed from the crack-propagating conditions.

In a typical blowout preventer, sheets of elastomer can be positioned between metallic inserts and then the elastomeric sheets can be subjected to the process of transfer or compression molding. In accordance with the methods described herein, sheets of elastomers can be replaced with sheets of self-healing elastomers as described herein.

In addition to maintaining integrity during normal well operations and/or a "kick" the presently described BOPs comprising modified elastomers in the packer may also be useful for sealing against the drill pipe during a "stripping" operation. During a stripping operation, the drill pipe can be pulled from the well bore with the blowout preventer closed against the drill pipe. This can result in wear and tear on the ram packer, particularly the elastomeric sealing element. Accordingly, also contemplated within the scope of embodiments presented herein is the use of the presently described BOPs during said stripping operations. Further contemplated within the scope of embodiments presented herein is the use of the BOPs comprising modified (to be self-healing) elastomers in the packer to regulate and monitor wellbore pressure; shut in the well (e.g., seal the void, annulus, between drill pipe and casing); "kill" the well (prevent the flow of formation fluid, influx, from the reservoir into the wellbore); seal the wellhead (close off the wellbore); or sever the casing or drill pipe during an emergency. U.S. application Ser. No. 14/964,639 describes certain blow out preventers having a modified design, which disclosure is incorporated herein by reference, and such blow out preventers are also contemplated for modification of elastomers therein using the methods and compositions provided herein. According to embodiments of the present disclosure, one or more packers in a BOP may be made entirely or partially of self-healing elastomers described herein.

FIG. 1 illustrates a cross-sectional view of a blowout preventer stack 10 that may include one or more packers made of a self-healing elastomer according to embodiments of the present disclosure. The stack can include a first blowout preventer 14 which can contain a pair of variable rams 16, a second blowout preventer 18 which can include a pair of blind shear rams, and one or more annular blowout preventers 23. The blowout preventer stack can be mounted on a wellhead casing 12. The wellhead casing 12 can be disposed around a wellbore 22 formed through a surface 24 by a tubular member, such as a drill pipe 26. In one example, a drill bit can be coupled to a lower end of the drill pipe 26 which can extend through the wellhead casing 12 and the wellbore 22 for extracting hydrocarbons from a reservoir.

The BOP 14 can be mounted below the one or more annular blowout preventers on an upper end of the wellhead casing 12. The BOP 14 can include a housing 28, the pair of variable rams 16, and a pair of biasing devices 32. The housing 28 can have an opening 30 which can be configured to receive the drill pipe 26. The pair of variable rams 16 can be disposed facing each other within the housing 28. Each of the biasing devices 32 can be coupled to a corresponding variable ram of the pair of variable rams 16. In certain embodiments, each of the biasing devices 32 may include a piston configured to reciprocate within a cylinder and a connecting rod coupled to such piston. Each biasing device 32 can be configured to selectively move the pair of variable rams 16 laterally in and out of the housing 28 relative to the opening 30. Various other types of biasing device 32 are envisioned without limiting the scope of the present technique.

In certain embodiments, each variable ram 16 may include a ram block and a ram packer assembly disposed at least in part within the ram block. In such embodiments, the ram packer assembly may include a plurality of inserts and a packer member made of a self-healing elastomer described herein. The variable ram 16 is discussed in greater detail below. In some embodiments, the second blowout preventer 18 can be disposed below the BOP 14 and is mounted on the wellhead casing 12.

It should be noted that in a cylindrical coordinate system, reference numeral 34 represents an axial direction of the variable ram 16, reference numeral 36 represents a radial direction of the variable ram 16, and reference numeral 38 represents a circumferential direction of the variable ram 16.

During operation, the drill pipe 26 can be configured to rotate along the circumferential direction 38 so as to excavate the wellbore 22 and extract hydrocarbons (fluid) from the reservoirs along the wellhead casing 12. In such embodiments, the extracted fluid from the reservoirs may be transported to a distant fluid storage facility through pipelines coupled to the wellhead casing 12. In some embodiments, during certain transient operating conditions, each of the biasing devices 32 is configured to move a corresponding variable ram 16 out of the housing 28 towards the opening 30. In such embodiments, a bore face 60 (FIG. 2) of each variable ram 16 can seal the drill pipe 26 so as to restrain a flow of the fluid along the wellhead casing 12. In other words, the pair of variable rams 16 can close the bore faces 60 against the drill pipe 26 to restrain the flow of the fluid along the wellhead casing 12. In some other embodiments, during certain transient operating conditions, the second blowout preventer 18 may be configured to cut through the drill pipe 26 as the pair of blind shear rams closes off the wellhead casing 12 to seal the wellbore 22 from an external environment. In one or more embodiments, the transient operation conditions may include extreme high pressure in the wellbore 22 and/or uncontrolled flow of the fluid along the wellhead casing 12. In one or more embodiments, the pair of variable rams 16 may be configured to provide a uniform and high contact pressure between a packer member and the drill pipe 26, thereby preventing leakage of the fluid.

Figure 2:
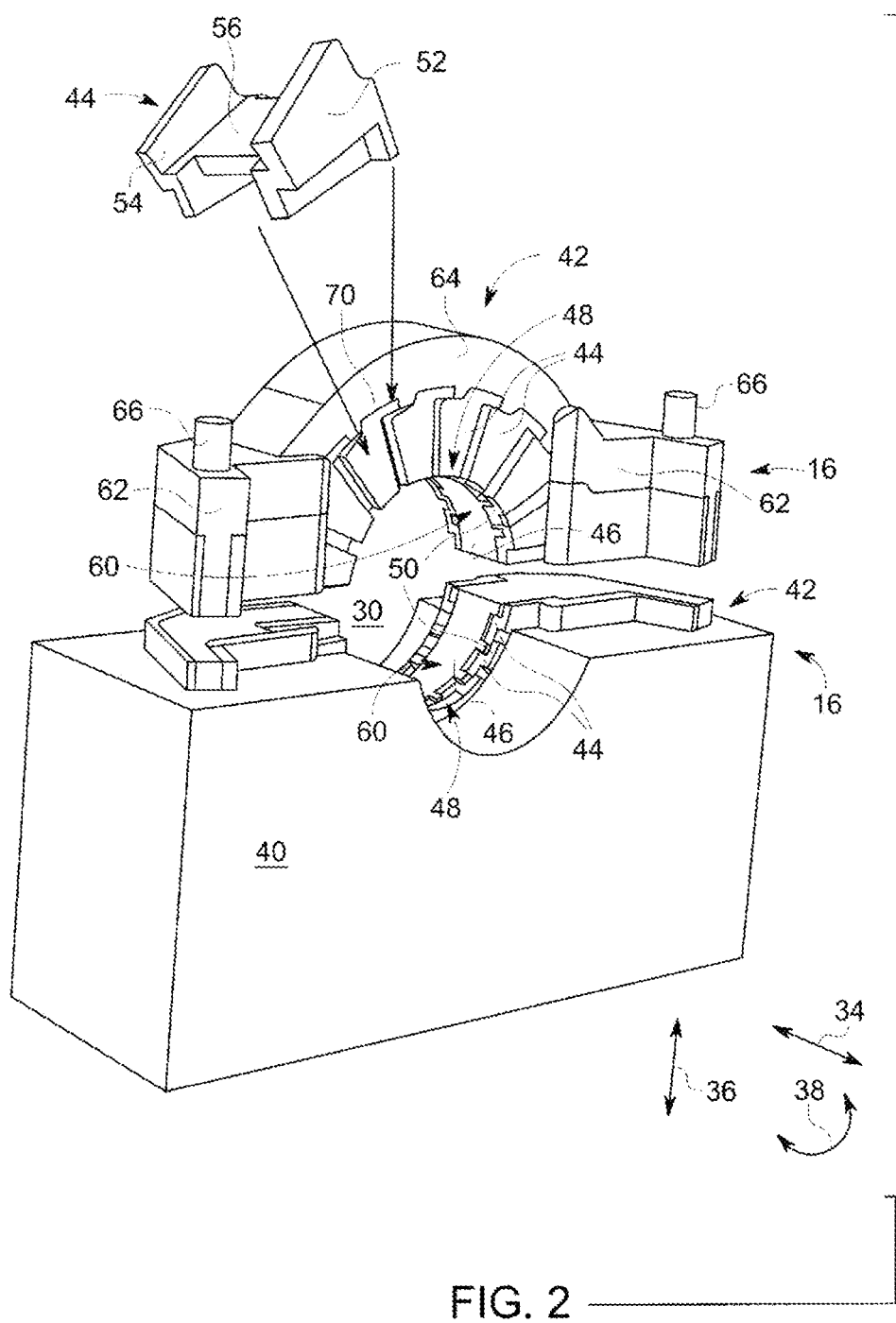
FIG. 2 is a perspective view of a pair of variable rams.

FIG. 2 illustrates a perspective view of a pair of variable rams 16 of FIG. 1 in accordance with one embodiment of the present technique. Each variable ram 16 can include a ram block 40 and a ram packer assembly 42. Although, in the illustrated embodiment, only one ram block 40 and a portion of one ram packer assembly 42 are shown to simplify the illustration of the pair of variable rams 16. The illustrated embodiment, however, should not be construed as a limitation of the present technique. In one embodiment, each of the biasing devices 32 (as shown in FIG. 1) can be coupled to a corresponding ram block 40 for selectively moving the pair of variable rams 16 in and out of the housing 28 (as shown in FIG. 1).

The ram packer assembly 42 can be disposed at least in part within the ram block 40. In one embodiment, the ram packer assembly 42 can include a plurality of inserts 44 and a packer member 46. The packer member 46 may be made of a self-healing elastomer according to embodiments disclosed herein. In the illustrated embodiment, each insert 44 of the plurality of inserts 44 can include a top plate 52, a bottom plate 54, and a central web 56 interconnecting the top plate 52 with the bottom plate 54. In certain embodiments, the plurality of inserts 44 can be made of a metal. The plurality of inserts 44 can be disposed adjacent to each other to form an insert array 48. In one embodiment, the insert array 48 can include a peripheral surface 50 which is disposed facing an opening 30 configured to receive a drill pipe 26 (as shown in FIG. 1).

In one embodiment, the packer member 46 can be coupled to at least a portion of the plurality of inserts 44 for providing a unitary or integral structure to the ram packer assembly 42. In certain embodiments, the packer member 46 can protrude from the peripheral surface 50 of the insert array 48 into the opening 30 to define a bore face 60 of each variable ram 16. Specifically, the packer member 46 can protrude inwardly towards the opening 30 along a radial direction 36 of the variable ram 16. Further, the packer member 46 can extend along a circumferential direction 38 of the variable ram 16.

In one embodiment, the ram packer assembly 42 can further include a pair of wing seals 62, a packer side seal 64, and a pair of pins 66. The packer side seal 64 can be coupled to another peripheral surface 70 of the insert array 48, disposed opposite to the peripheral surface 50. Each wing seal of the pair of wing seals 62 can be coupled to a corresponding peripheral side of the ram packer assembly 42. Each pin of the pair of pins 66 can be coupled to a corresponding wing seal of the pair of wings seals 62. In such embodiments, the ram packer assembly 42 can be disposed at least in part in the ram block 40 and coupled to the ram block 40 via the pair of pins 66 and a corresponding pair of slots (not shown in FIG. 2) formed in the ram block 40.

Figure 3:
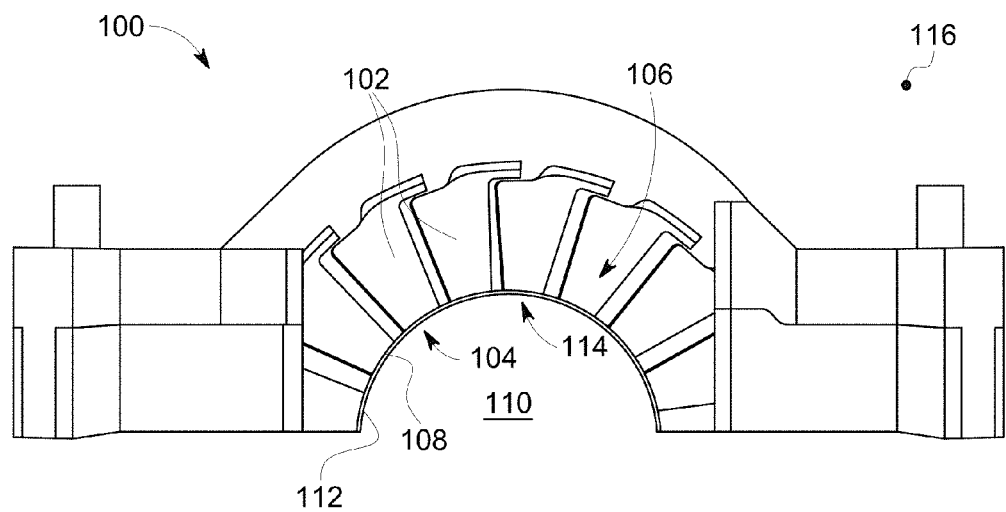
FIG. 3 is a schematic diagram of a typical ram packer assembly.

FIG. 3 illustrates a schematic diagram of a typical ram packer assembly 100. In the illustrated embodiment, the ram packer assembly 100 can include a plurality of inserts 102 and a packer member 104, where the packer member 104 may be formed of a self-healing elastomer as disclosed herein. The plurality of inserts 102 can be configured to form an insert array 106 having a peripheral surface 108 disposed facing an opening 110. Further, a peripheral surface 112 of the packer member 104 can be aligned with the peripheral surface 108 of the insert array 106 to define a bore face 114 of a variable ram. Specifically, the peripheral surface 112 of the packer member 104 can be aligned with the peripheral surface 108 of the insert array 106 along an axial direction 116 of the variable ram. In such embodiments, during operation of the variable ram, the packer member 104 at the bore face 114 can be exposed to high pressure and high temperature conditions. Under high pressure (HP) and/or high temperature (HT) conditions, the packer member 104 (see FIG. 3) at the bore face 114, (see FIG. 3) may deform and wear. The directed self-healing packers described herein advantageously reduce the wear/depletion of the packer member 104.

Figure 4A:
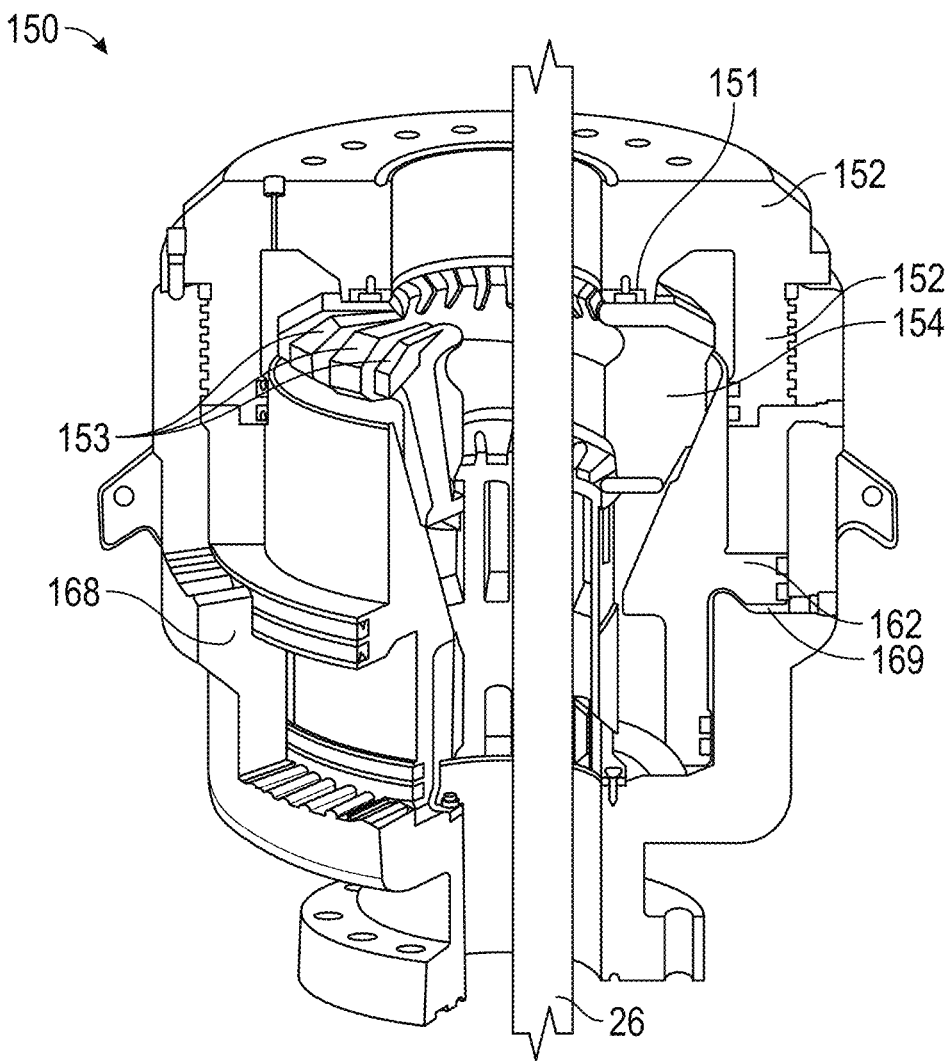
FIGS. 4A and 4B are schematic views of a typical annular packer assembly.
Figure 4B:
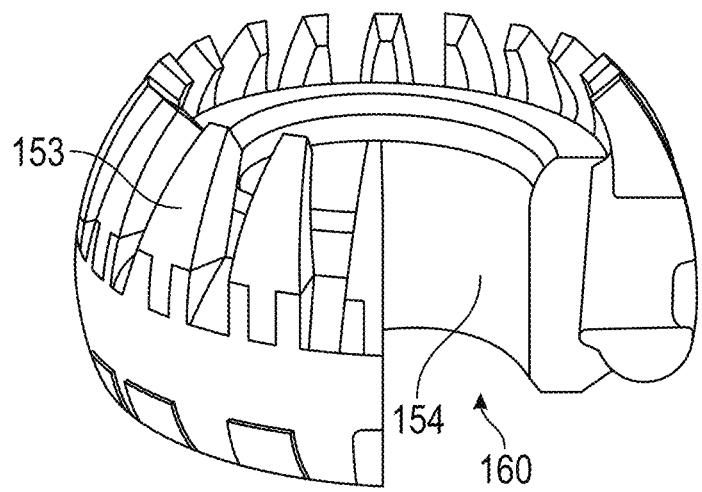

FIGS. 4A and 4B illustrate schematic views of typical annular packer assemblies 150 which are located circumferentially around a drill pipe 26. In the illustrated embodiment, the annular packer assembly 150 can include a wear plate 151 that eliminates metal to metal contact between the packing unit inserts and the BOP latched head 152. A plurality of inserts 153 and a packer member 154 can be configured to form a sealing element 160 disposed around the drill pipe 26. The packer member 154 may be formed of a self-healing elastomer according to embodiments of the present disclosure. The closing of the BOP can be driven by hydraulic pressures which push a closing chamber 169 to raise the piston 162 and squeeze the sealing element 160 radially inward for sealing.

To improve HP/HT performance in an annular packing unit of ram and annular BOP packers, a specific combination of physical properties must be met. For example, to maintain operational performance of a packer, the modulus of the packer at 100% strain cannot be reduced. Thus, incorporating self-healing agents into a packer material is problematic because self-healing agents typically lower the modulus due to a softening effect. Additionally, strength properties of a packer such as tear strength and tensile strength must be maximized to gain superior performance of the packer at high pressures. By using formulations described herein, compositions incorporating a self-healing agent may be used to form a packer without sacrificing necessary properties for operational performance, such as modulus, tear strength, and tensile strength.

Table 1 illustrates the interaction of the self-healing agent and silica in self-healing elastomeric compounds according to embodiments of the present disclosure compared with a control compound. Components added are measured in phr, or parts per hundred rubber. Lupasol PR was chosen as the self-healing agent. HNBR was chosen as the base elastomer in the tested self-healing elastomeric compounds.

TABLE 1

| | Control | A | B | C | D |
|---|---|---|---|---|---|
| Components | | | | | |
| HNBR Polymer | 100 | 100 | 100 | 100 | 100 |
| N326 Carbon Black | 20 | 20 | 20 | 20 | 20 |
| N550 Carbon Black | | | 20 | | |
| Silica, precipitated | 30 | 30 | 30 | 15 | |
| Silica, fumed | | | | 15 | 30 |
| Lupasol PR | | 1.5 | 1.5 | 1.5 | 1.5 |
| Stearic Acid | 1 | 1 | 1 | 1 | 1 |
| Zinc Oxide | 5 | 5 | 5 | 5 | 5 |
| ASD-75 Sulfur | 1.5 | 1.5 | 1.5 | 1.5 | 1.5 |
| HVA-2 Coagent | 3 | 3 | 3 | 3 | 3 |
| VC 40KE Peroxide | 6 | 6 | 6 | 6 | 6 |
| Test Results | | | | | |
| Modulus at 100% strain, psi | 650 | 536 | 884 | 635 | 649 |
| Tensile Strength, psi | 3237 | 3654 | 3578 | 3372 | 3619 |
| Tear Strength, pli | 158 | 166 | 182 | 168 | 182 |
| Fatigue at 250 F., cycles to fail* | 51 | 1000 | 746 | 1000 | 1000 |

*tests stopped at 1000 cycles

Outside of the control experiment, 1,2-ethanediamine, polymer with aziridine (commercially available as Lupasol® PR with an average molar mass of 2,000) was used as the self-healing agent in amounts of 1.5 phr for each test. Both precipitated and fumed silica can be tested. Experiment B can also include 20 phr of N550 carbon black. Generally, adding a polyethyleneimine such as Lupasol® PR to the composition can have the effect of increasing the tensile strength, tear strength, and fatigue at 250° F. of the compound but can also lower the modulus in a way that would be undesired. Compound B exhibits a common way of regaining modulus, yet the fatigue performance is found to be sacrificed. Compound C shows the benefit of using fumed silica in place of carbon black, whose concentrations are further optimized in Compound D. The blend of a N300 series and greater amounts of fumed silica with the other compositional elements in Compound D were found to meet the unique set of physical properties that allows the composition to be used for forming packers, according to embodiments of the present disclosure. In a compound containing a self-healing agent according to embodiments of the present disclosure, both tear and tensile strength exceed those properties exhibited by the control composition while also maintaining modulus and fatigue.

The carbon black used in self-healing elastomer compounds according to embodiments of the present disclosure may include a N110 series carbon black, a N200 series carbon black, N300 series carbon black, N500 series carbon black, a N700 series of carbon black, or a combination thereof. The carbon black may be present in the compound in concentrations between 5 and 60 phr.

The silica used in self-healing elastomer compounds according to embodiments of the present disclosure may include precipitated silica, fumed silica, or a combination thereof. This silica may be present in the compound in concentrations between 5 and 60 phr.

The self-healing agent used in self-healing elastomer compounds according to embodiments of the present disclosure may include multifunctional cationic polyethyleneimines (PEI) with a branched polymer structure, such as those commercially available under the names Lupasol® PR, Lupasol® P, Lupasol® SK, Lupasol® WF, Lupasol® PR 8515, Lupasol® G 20, Lupasol® PS, Lupasol® G 20 water free, Lupasol® SC61B, or a combination thereof. The self-healing agent may be present in the compound in concentrations between 0.05 and 30 phr.

The fatty acid used in self-healing elastomer compounds according to embodiments of the present disclosure may include a stearic acid. The fatty acid may be present in the compound in concentrations between 0.1 and 5 phr.

The metal oxide used in self-healing elastomer compounds according to embodiments of the present disclosure may include a zinc oxide. The oxide may be present in the compound in concentrations between 1 and 10 phr.

The sulfur used in self-healing elastomer compounds according to embodiments of the present disclosure may include ASD-75 sulfur. The sulfur may be present in the compound in concentrations between 0.1 and 5 phr. The sulfur can be a soluble sulfur or insoluble sulfur.

The coagent used in self-healing elastomer compounds according to embodiments of the present disclosure may include HVA-2 (N,N'-m-phenylenedimaleimide), TAIC (triallyl isocyanurate, $C_{12}H_{15}N_3O_3$), TAC (triallyl cyanurate), MPDM (N,N'-m-phenylene dimaleimide), TMPTA (trimethylol propane triacrylate), or a combination thereof. The coagent may be present in the compound in concentrations between 0.1 and 10 phr.

The peroxide used in self-healing elastomer compounds according to embodiments of the present disclosure may be used to initiate a free radical crosslink process in the compound. Suitable peroxides may include, for example, VC 40KE, VC-60, dicumyl peroxide (DCP), 1,3 1,4-bis (tert-butyl peroxy isopropyl) benzene (DIPP), 2,5-Dimethyl 2,5-di (tert.butylperoxy) hexyne-3 (DYBP), 2,5-Dimethyl-2,5-di(tertbutylperoxy)hexane (DHBP), 1,1'-di(tert-butylperoxy)-3,3,5-trimethylcyclohexane (TMCH), or a combination thereof. The peroxide may be present in the compound in concentrations between 0.1 and 10 phr.

The accelerator used in self-healing elastomer compounds according to embodiments of the present disclosure may include a thiuram compound, a dithiocarbamate compound, 2-2'-Dithiobis(benzothiazole) (MBTS), tetramethylthiuram disulfide (TMTD), tetraethylthiuram disulfide (TETD), or a combination thereof.

Self-healing elastomer compounds according to embodiments of the present disclosure may be made by mixing the ingredients, e.g., using a Banbury or other high-shear mixer such as a roller mill. In one or more embodiments, all ingredients of a self-healing elastomer compound except curing agents may be mixed into a stock at relatively higher temperatures, e.g., greater than 100° F. up to 300° F., where the stock ingredients are dispersed and distributed throughout the stock. Upon cooling of the stock, the curing agents may be added to the stock with temperatures not exceeding 210° F. Curing agents may include, for example, sulfur, accelerators, peroxides, and coagents. Sheets of this stock are cured at temperatures up to 320° F. in molds to produce packers according to embodiments of the present disclosure.

Self-healing elastomer compounds according to embodiments of the present disclosure may be formulated using either sulfur or peroxide curing agents or using both sulfur and peroxide curing agents. In formulations including sulfur, the sulfur curing agents may include either all sulfur (insoluble or soluble S8) or sulfur plus an accelerator, as described above.

Although the technology herein has been described with reference to embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed:

1. A self-healing elastomeric compound for comprising:
   one or more elastomers;
   carbon black;
   silica;
   a self-healing agent; and
   a curing agent comprising sulfur and a peroxide,
   wherein the self-healing agent comprises polyethyleneimine,
   wherein the self-healing agent has a concentration between 0.05 and 30 parts per hundred resin (phr) of the one or more elastomers,
   wherein the silica has a concentration between 5 and 50 phr of the one or more elastomers,
   wherein the sulfur has a concentration between 0.1 and 5 phr of the one or more elastomers,
   wherein the peroxide has a concentration between 0.1 and 10 phr of the one or more elastomers, and
   wherein the self-healing elastomeric compound is used for a packer in a blowout preventer (BOP) mounted on a wellhead casing.

2. The compound of claim 1, wherein the one or more elastomers is selected from the group consisting of nitrilebutadiene rubber (NBR), hydrogenated nitrile butadiene rubber (HNBR), carboxylated nitrile butadiene rubber (XNBR), fluoroelastomers (FKM), perfluoroelastomers (FFKM), and natural rubber (NR).

3. The compound of claim 1, wherein the carbon black has a concentration between 5 and 40 parts per hundred resin (phr) of the one or more elastomers.

4. The compound of claim 1, wherein the silica is a precipitated silica, fumed silica, or a combination thereof.

5. The compound of claim 1 wherein the self-healing agent is evenly distributed throughout the self-healing elastomeric compound.

6. The self-healing elastomeric compound of claim 1, further comprising a fatty acid having a concentration of between 0.1 and 5 phr of the one or more elastomers.

7. The composition of claim 1, wherein the curing agent further comprises one or more selected from the group consisting of an accelerator and a coagent,
   wherein the accelerator comprises at least one of 2-2'-Dithiobis (benzothiazole), tetramethylthiuram disulfide, and tetraethylthiuram disulfide,
   wherein the coagent comprises at least one of N,N'-m-phenylenedimaleimide, C12H15N3O3, triallyl cyanurate, N,N'-m-phenylene dimaleimide, and trimethylol propane triacrylate.

8. A system, comprising:
   at least one elastomeric packer, wherein each of the at least one elastomeric packer is made of a self-healing elastomer compound, comprising:
   an elastomer;
   a self-healing agent evenly distributed throughout the self-healing elastomer compound;
   carbon black;
   silica; and
   a curing agent comprising sulfur and a peroxide,
   wherein the self-healing agent comprises polyethyleneimine,
   wherein the self-healing agent has a concentration between 0.05 and 30 parts per hundred resin (phr) of the elastomer,
   wherein the silica has a concentration between 5 and 50 phr of the elastomer, wherein the sulfur has a concentration between 0.1 and 5 phr of the one or more elastomers, wherein the peroxide has a concentration between 0.1 and 10 phr of the one or more elastomers, and wherein the at least one elastomeric packer is used in a blowout preventer (BOP) mounted on a wellhead casing.

9. The system of claim 8, wherein the at least one elastomeric packer comprises a variable bore ram packer.

10. The system of claim 8, wherein the at least one elastomeric packer comprises an annular packer.

11. The system of claim 8, wherein the at least one elastomeric packer comprises a fixed bore ream packer.

12. The self-healing elastomeric compound of claim 8, wherein the elastomer comprises at least one of a fluoroelastomer (FKM), a perfluoroelastomers (FFKM), or combinations therein.

13. A method for increasing a life of a blowout preventer (BOP) comprising:
   assembling a BOP packer in the BOP, wherein the BOP is mounted on a wellhead casing, and wherein the BOP packer is made of a self-healing elastomer compound comprising:
   an elastomer;
   a self-healing agent;
   carbon black;
   a curing agent comprising sulfur and a peroxide; and
   silica,
   wherein the self-healing agent comprises polyethyleneimine,
   wherein the self-healing agent has a concentration between 0.05 and 30 parts per hundred resin (phr) of the elastomer,
   wherein the silica has a concentration between 5 and 50 phr of the elastomer, and
   wherein the sulfur has a concentration between 0.1 and 5 phr of the one or more elastomers, and
   wherein the peroxide has a concentration between 0.1 and 10 phr of the one or more elastomers, and
   activating the self-healing agent in the BOP packer, wherein the self-healing agent is activated by initiating a chemical bond creation within the self-healing elastomer compound at crack-propagating conditions.

14. The method of claim 13, wherein the silica is fumed silica dispersed throughout the BOP packer.

15. The method of claim 13, further comprising using the self-healing agent to repair micro-cracks in the BOP packer.

16. The method of claim 13, wherein the self-healing elastomer compound is formed by:
   dispersing and distributing the self-healing agent, the carbon black, and the silica evenly into the elastomer by mixing at a temperature in a range of greater than 100° F. up to 300° F. to produce a stock;
   mixing, with the stock, a curing agent to produce a mixture; and
   curing the mixture at a temperature of greater than 210° F. and less than 320° F. to produce the BOP packer.

* * * * *